United States Patent
Von Der Hellen

[11] 3,893,499
[45] July 8, 1975

[54] INSIDE LATCH UNIT FOR TIRE CHAINS

[76] Inventor: Robert L. Von Der Hellen, Riley Rd., Eagle Point, Oreg. 97524

[22] Filed: Mar. 8, 1974

[21] Appl. No.: 449,346

[52] U.S. Cl............... 152/213 A; 152/217; 152/241
[51] Int. Cl............................................. B60c 27/06
[58] Field of Search..................... 254/65; 81/15.8; 152/213 R, 213 A, 217, 218, 219, 241, 242; 24/134 L, 134 KB, 68 TT

[56] References Cited
UNITED STATES PATENTS
2,275,994  3/1942  Ruhkala.......................... 152/213 R
2,622,651  12/1952  Gause............................. 152/213 R
2,845,674  8/1958  Pearson.......................... 24/134 KB Primary Examiner—Robert B. Reeves
Assistant Examiner—Larry H. Martin
Attorney, Agent, or Firm—Roger B. Webster

[57] ABSTRACT

Tire chains having an inside latch unit adapted to be secured—after the chains are encircled about a vehicle tire—without the necessity of a person reaching behind the tire; such inside latch unit comprising—the connection between the ends of the inner circumferential side chain—a pull cord and a cam lock through which the pull cord extends for manipulation from a convenient point ahead of the tire.

3 Claims, 6 Drawing Figures

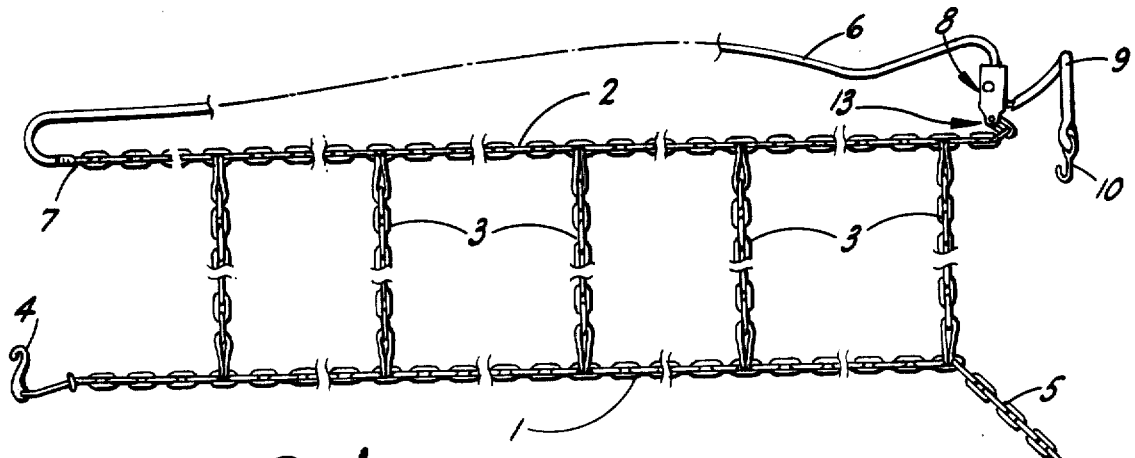
FIG-1
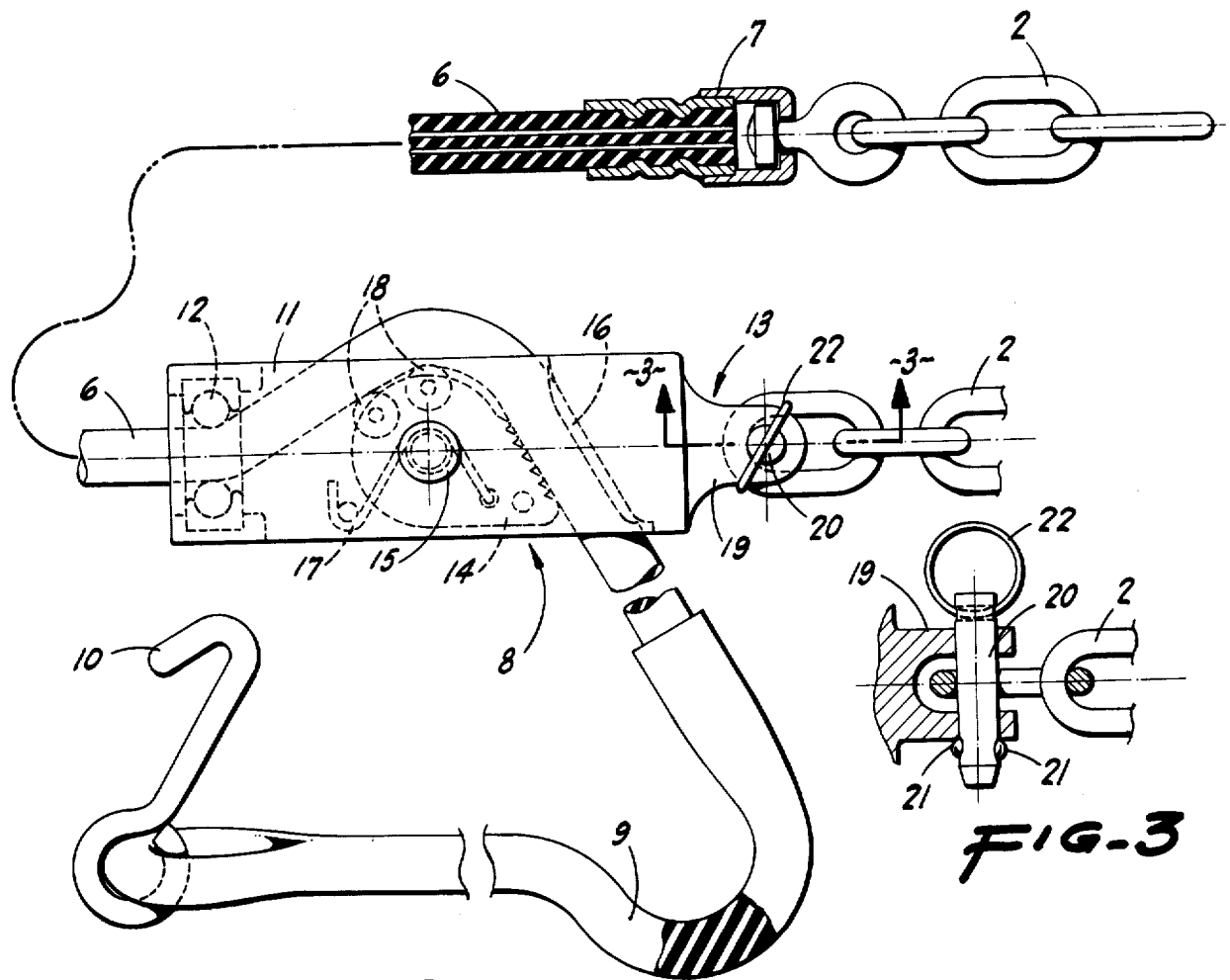
FIG-2
FIG-3

3,893,499

SHEET 2

3,893,499

INSIDE LATCH UNIT FOR TIRE CHAINS

BACKGROUND OF THE INVENTION

In use of conventional tire chains, the person applying the tire chains must reach behind the tire in order to engage the common type of inside latch unit which connects the ends of the inner circumferential side chain; this being a difficult, awkward, and often exasperating operation, especially when undertaken in adverse weather or road conditions. The present invention was conceived in a successful effort to avoid such problem in the application of tire chains to a vehicle tire.

SUMMARY OF THE INVENTION

The present invention provides, as a major object, tire chains having a novel inside latch unit which—after the chains are encircled about a vehicle tire—is brought into play or secured in a ready and convenient manner, and without the necessity of a person reaching behind the tire.

The present invention provides, as another important object, a tire chain, as above, wherein said inside latch unit comprises—as the connection between the ends of the inner circumferential side chain—a cam lock attached to one end of the inner circumferential side chain, and a pull cord attached to the other end of the circumferential side chain and extending through the cam lock whereby, upon the free end portion of the cord (from a convenient point ahead of the tire) being pulled in a direction to tighten said inner circumferential side chain, the cam lock then acts to prevent retraction of the cord and accidental loosening of such side chain.

The present invention provides, as a further object, an inside latch unit for tire chains which is designed for ease and economy of manufacture.

The present invention provides, as a still further object, a practical, reliable, and durable inside latch unit for tire chains, and one which is exceedingly effective for the purpose for which it is designed.

BRIEF DESCRIPTION OF THE DRAWINGS

FIG. 1 is a plan view, foreshortened both longitudinally and transversely, of tire chains embodying the inside latch unit of the present invention.

FIG. 2 is an enlarged view of the inside latch unit displayed in plan array; the pull cord being partially broken away, and in part in section.

FIG. 3 is a fragmentary section taken on line 3—3 of FIG. 2.

DESCRIPTION OF THE PREFERRED EMBODIMENT

Figure 4:
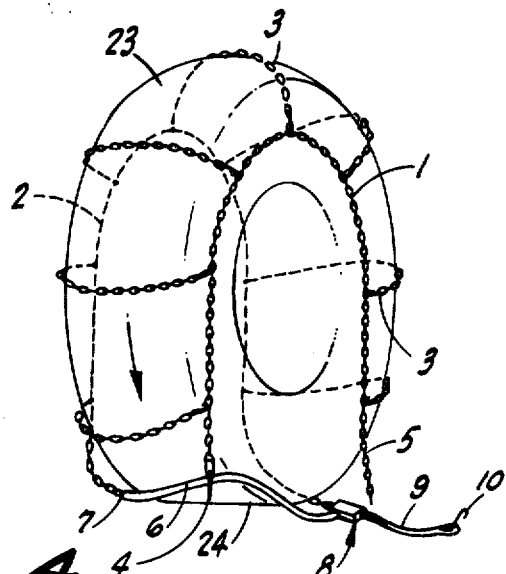
FIG. 4 is a perspective view, in dotted outline, of the front side of a tire; the view showing the tire chains as initially draped over the tire.

Referring now more particularly to the drawings and to the characters of reference marked thereon, the inside latch unit of the present invention is employed in connection with otherwise conventional tire chains which include an outer circumferential side chain 1, a laterally inwardly spaced, inner circumferential side chain 2, and a plurality of cross chains 3 which connect between the side chains 1 and 2 at intervals.

The outer side chain 1 is adapted to be end-connected and held taut when the chains are encircled about a tire by means of a conventional outside latch unit 4 attached to one end of the outer side chain 1 and arranged to be adjustably coupled to a short free portion 5 of said side chain 1 at the other end thereof.

The inner side chain 2 is adapted to be tensioned and then held taut—after the chains are encircled about a tire—by means of the inside latch unit of the present invention. Such inside latch unit comprises—as shown in detail in FIGS. 1, 2, and 3—a flexible pull cord 6 swivelly connected, as at 7, to one end of the inner side chain 2. The pull cord 6 thence extends to the other end of said inner side chain 2 and there passes—in initially slidable relation—through a cam lock (or cam cleat) indicated generally at 8; a free portion 9 of the pull cord 6 extending beyond the cam lock 8 for manual access, and there being a hook 10 on the outer end of such cord portion 9.

The cam lock 8 comprises a hollow, transversely narrow case 11 fitted at one end with an annular bearing 12 through which the pull cord 6 passes in normally easy running relation; the case 11 being attached, as indicated generally at 13, to the end of the inner side chain 2 opposite the swivel connection 7.

Within the case 11, the pull cord 6 extends between the peripheral working edge of a spring-urged, eccentric cam 14—pivoted as at 15—and an anvil 16 in the case 11 at the end adjacent the attachment 13. The working edge of the cam 14 is toothed (as shown), with the teeth inclined in a direction to permit unrestricted travel of the pull cord 6 in an advancing direction; i.e., in a direction to shorten its effective length between the swivel 7 and the case 11. However, upon any tendency of any counter travel or retraction of the pull cord 6, the teeth grip such cord and cause the cam 14 to rotatably react and bind the cord against the anvil 16, preventing such retraction. This action of the cam 14 is enhanced by a spring 17. After passing between the cam 14 and the anvil 16, the pull cord 6 runs angularly out of the case 11 adjacent the end opposite the bearing 12.

Small rollers 18 on the cam 14 further assure that the pull cord 6 can normally run free over the cam when such pull cord is advanced; i.e., moved in a direction to shorten its effective length between the swivel 7 and the case 11. However, the positioning of the rollers 18 is such that—upon initiation of any retracting motion of the pull cord 6—they do not interfere with operation of the eccentric cam 14 to jam-lock the pull cord 6 against the anvil 16.

The attachment 13 between the case 11 and the related end of side chain 2 comprises a clevis 19 which receives therein the adjacent endmost link of said inner side chain 2; such link normally being maintained in the clevis 19 by means of a cross pin 20 which spans through such clevis. While the cross pin 20 is normally maintained against accidental escape from the clevis 19 by detents 21, such cross pin 20 can be manually removed, and which removal is facilitated by a pull ring 22 on the end of the cross pin 20 opposite the detents 21.

While the pull cord 6, for the major portion of its length, is of heavy-duty, non-elastic vulcanized construction, the cord portion 9 (or at least its outermost part) is elastic; this for the reason that will hereinafter appear.

Figure 5:
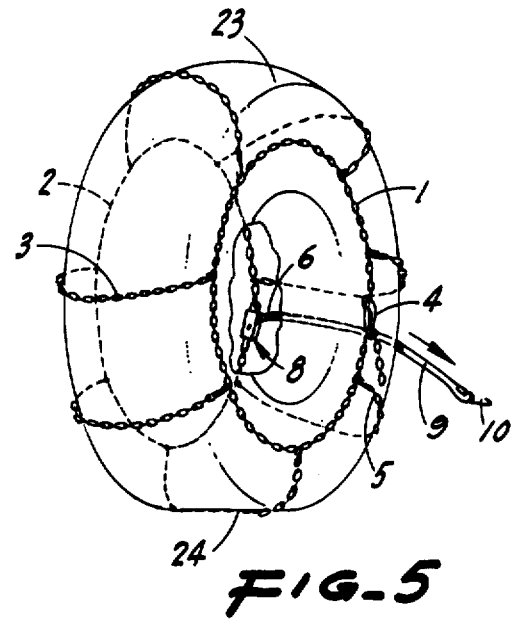
FIG. 5 is a similar view—partly broken away—showing the outside latch unit connected, and the inside latch unit in position for take-up or tensioning by the pull cord.
Figure 6:
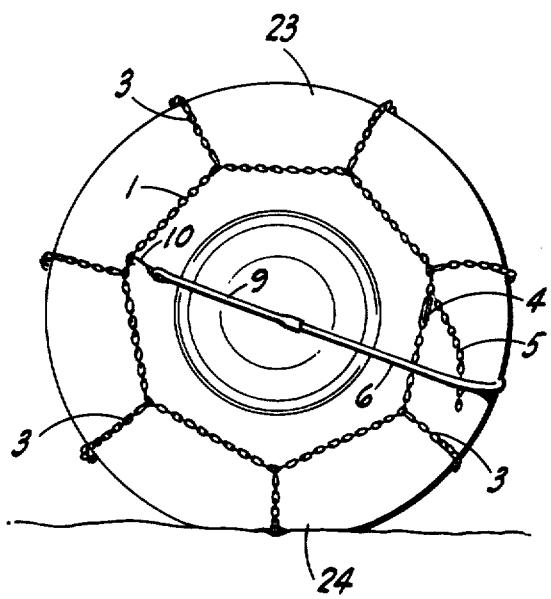
FIG. 6 is a front elevation, in outline, of the tire with the tire chains installed and ready for use.

The tire chains—with the above-described inside latch unit embodied therein—are applied to a tire 23 in the manner shown in FIGS. 4, 5, and 6.

The tire chains are first draped over the tire as shown in FIG. 4, with the outer side chain 1 in position such that the cross chains 3 span laterally inwardly over the tread of the tire and hold the inner side chain 2 in a position corresponding to the outer side chain 1.

When the tire chains are initially draped over the tire, the outside latch unit 4 and the chain portion 5 hang free, while the pull cord—which remains at all times engaged through the cam lock 8—is initially manually positioned so that it loops about the road-contact area 24 of tire 23 from the rear of the latter.

Nextly, the vehicle is backed up a short distance until the tire runs over the looped pull cord 6 and the tire chains engage under the tire 23 at the road-contact area 24 in a zone of said tire chains such that said pull cord 6 together with the cam lock 8, as well as the outside latch unit 4 and chain portion 5, are all in position at the front of the tire between the top and bottom thereof.

Thereafter, as shown in FIG. 5, the outside latch unit 4 is engaged loosely with the chain portion 5, and—from a convenient point ahead of the tire 23—the cord portion 9 is manually grasped and forcefully pulled forwardly (but at an angle) causing such pull cord 6 to run through the cam lock 8 until the cord is under substantial tension between the swivel 7 and case 11. Then, upon manual release of the cord portion 9, the cord 6 tends to retract, but which retraction is at once prevented by the cam lock 8; i.e., such cam frictionally binds or locks the pull cord 6 against the anvil 16. With the drawing of the pull cord taut between the swivel 7 and case 11, and engagement of cam lock 8, the inner latch unit is secured, and which, of course, holds the inner side chain 2 taut.

As the next step in applying the tire chains to a tire, the outside latch unit 4 is tightened in its connection with the chain portion 5 whereby to hold the outer side chain taut.

Lastly, the cord portion 9, together with such part of the cord 6 as has been drawn through the cam lock 8, is spanned—under the elastic tension of said cord portion 9—across the face of the wheel (see FIG. 6), and the hook 10 engaged with the outer side chain 1 at a generally opposed point. As so applied, the chains remain in effective position of use on the tire.

As will be apparent, and by reason of the fact that the inside latch unit is secured from a convenient point ahead of the tire, it is unnecessary to reach behind the tire—as is now the case—when tire chains are being applied.

After use of the tire chains, and when it is desired to remove them from the tire, it is only necessary to disconnect the outside latch unit 4 and to manually pull the cross pin 20; these two manipulations releasing the outer side chain 1 and inner side chain 2 whereby the tire chains can be easily lifted off the tire.

From the foregoing description, it will be readily seen that there has been produced such an inside latch unit for tire chains as substantially fulfills the objects of the invention as set forth herein.

While this specification sets forth in detail the present and preferred construction of the inside latch unit for tire chains, still in practice such deviations from such detail may be resorted to as do not form a departure from the spirit of the invention as defined by the appended claims.

I claim:

1. In tire chains which include an outer circumferential tire chain, an inner circumferential tire chain, spaced cross chains connected between the side chains at intervals, an outside latch unit adapted to end-connect the outer side chain, and a flexible pull-cord actuated inside latch unit adapted to end-connect the inner side chain; the improvement characterized by the inside latch unit comprising a self-acting, eccentric-cam, cord-locking device through which the pull-cord extends intermediate its ends, the pull-cord being connected to one end of the inner side chain, and means connecting the cord-locking device to the other end of the inner side chain, the pull-cord extending in initially slidable relation through the cord-locking device, and the latter being arranged to lock the cord against retraction when said cord is manually pulled through the device until tensioned between the ends of the inner side chain and the latter is drawn taut; said connecting means for the cord-locking device including initially engaged but manually disengageable parts whereby to disconnect the cord-locking device from the inner side chain, and a case in which the eccentric-cam is pivoted, the cam having a peripheral edge leading to a cord-locking point, said case including an annular bearing ahead of the eccentric-cam; the cord entering the case in free-sliding relationship through said annular bearing and then extending about said peripheral edge.

2. An improved inside latch unit, as in claim 1, in which the manually disengageable parts comprise an exposed clevis on the cord-locking device, the link at said other end of the inner side chain being disposed in the clevis, and a manually removable cross pin on the clevis extending through such link.

3. An improved inside latch unit, as in claim 1, which includes a cord-engaging rollers on the cam in position to facilitate sliding motion of the cord over such edge in advance of said locking point.

* * * * *